United States Patent [19]
Ishizuka

[11] Patent Number: 5,663,794
[45] Date of Patent: Sep. 2, 1997

[54] DISPLACEMENT INFORMATION DETECTION APPARATUS, SCALE USED IN THE APPARATUS, AND DRIVE APPARATUS USING THE APPARATUS

[75] Inventor: Kou Ishizuka, Ohmiya, Japan

[73] Assignee: Canon Kabushiki Kaisha, Tokyo, Japan

[21] Appl. No.: 601,694

[22] Filed: Feb. 15, 1996

[30] Foreign Application Priority Data

Feb. 15, 1995 [JP] Japan ..................... 7-026747

[51] Int. Cl.$^6$ ..................................... G61B 9/02
[52] U.S. Cl. ........................... 356/356; 250/237 G
[58] Field of Search ..................... 356/345, 356, 356/358, 363, 354; 350/237 G, 231.13, 231.14, 231.16, 231.18

[56] References Cited

U.S. PATENT DOCUMENTS

| | | | |
|---|---|---|---|
| 5,283,434 | 2/1994 | Ishizuka et al. | 250/237 G |
| 5,390,022 | 2/1995 | Ishizuka et al. | 356/356 |
| 5,448,358 | 9/1995 | Ishizuka et al. | 356/373 |
| 5,481,106 | 1/1996 | Nyui et al. | 250/237 G |
| 5,483,377 | 1/1996 | Kaneda et al. | 359/566 |
| 5,498,870 | 3/1996 | Ishizuka | 250/237 G |

FOREIGN PATENT DOCUMENTS 8210824  8/1996  Japan.

*Primary Examiner*—Frank Font
*Assistant Examiner*—Robert Kim
*Attorney, Agent, or Firm*—Fitzpatrick, Cella, Harper & Scinto

[57] ABSTRACT

An apparatus for detecting displacement information is disclosed. The apparatus is provided with a scale arranged on the side of an object of which relative displacement information is to be detected, a periodic signal generation diffraction grating formed at a predetermined pitch, and a predetermined data recording portion formed independently of the periodic signal generation and diffraction grating for detecting displacement information, a first detection system for irradiating a light beam onto the periodic signal generation diffraction grating to generate diffracted light, the first detection system forming a periodic signal corresponding to a displacement relative to the scale by detecting interference light of the diffracted light generated by the periodic signal generation diffraction grating, and a second detection system for optically detecting the predetermined data recording portion. The predetermined data recording portion also has a diffraction grating.

24 Claims, 12 Drawing Sheets

DISPLACEMENT INFORMATION DETECTION APPARATUS, SCALE USED IN THE APPARATUS, AND DRIVE APPARATUS USING THE APPARATUS

BACKGROUND OF THE INVENTION

1. Field of the Invention

The present invention relates to a displacement information detection apparatus, a displacement information detection scale, and a drive control apparatus using the apparatus. The present invention can be particularly suitabe for a rotary encoder for detecting a rotation position, a rotation position deviation amount, a rotation position deviation direction, a rotational speed, the rotational acceleration, and the like, by irradiating a light beam onto a radial diffraction grating and a code pattern on a disk attached to a relative rotary object, and detecting modulated signal light obtained therefrom, and an apparatus (e.g., a motor with an encoder) for attaining rotational movement of the object by controlling the current amount and direction of a driving apparatus such as an AC motor or the like on the basis of the detection information.

2. Related Background Art

Conventionally, an incremental rotary encoder is utilized for the purpose of measuring the rotation information (rotation displacement amount, speed, acceleration, and the like) of an object with high precision. On the other hand, a brushless motor represented by an AC motor utilizes an absolute rotary encoder for detecting the absolute rotation position of a rotor in the motor so as to perform rotation.

For this reason, in rotation position control of an object utilizing an AC motor or the like, a composite type rotary encoder which can obtain both types of signals is used.

In a high-precision incremental encoder, a monochrome light beam is irradiated onto a scale on which a very fine grating pattern on the micron order is recorded, and at least two diffracted light components obtained by this scale are extracted and interfered with each other, thereby generating a periodic change in amount of light upon movement of the grating. A photoelectric conversion element detects this change to output an incremental encoder signal.

An absolute rotary encoder outputs the absolute rotation position of a disk by detecting transmitted light (or reflected light) at a specific position on each circumference when a plurality of transmission/non-transmission (or reflection/non-reflection) patterns (e.g., gray code patterns) are formed on circumferences at different radial positions on the rotary disk so that only a specific combination of codes is detected per revolution.

An absolute encoder for a motor outputs the relative position between the rotor and stator of the motor by detecting transmitted light (or reflected light) at a specific position on each circumference when a plurality of transmission/non-transmission (or reflection/non-reflection) patterns (e.g., gray code patterns) are formed on circumferences at different radial positions on the rotary disk so that only M combinations of codes are available in correspondence with the motor structure (the number M of poles).

The recent trend is to require a size reduction (e.g., a disk with a diameter of 10 mm) of encoders. However, it is difficult to attain such size reduction of a composite encoder based on the different principles, as described above.

Optical systems based on the different detection principles may be simply juxtaposed, and size reductions of the respective optical systems may be separately attained. In this case, a size reduction attained by the overall structure is limited.

In particular, when a plurality of patterns for the composite encoder are formed on a scale, patterns capable of attaining both a compact structure and high-precision detection are required.

SUMMARY OF THE INVENTION

It is the first object of the present invention to provide a displacement information detection apparatus with an arrangement that can attain both a compact structure and high-precision detection, a displacement information detection scale suitable therefor, and a drive control apparatus using them.

Other objects of the present invention will become apparent from the following description of the embodiments.

DESCRIPTION OF THE PREFERRED EMBODIMENTS

Figure 1:
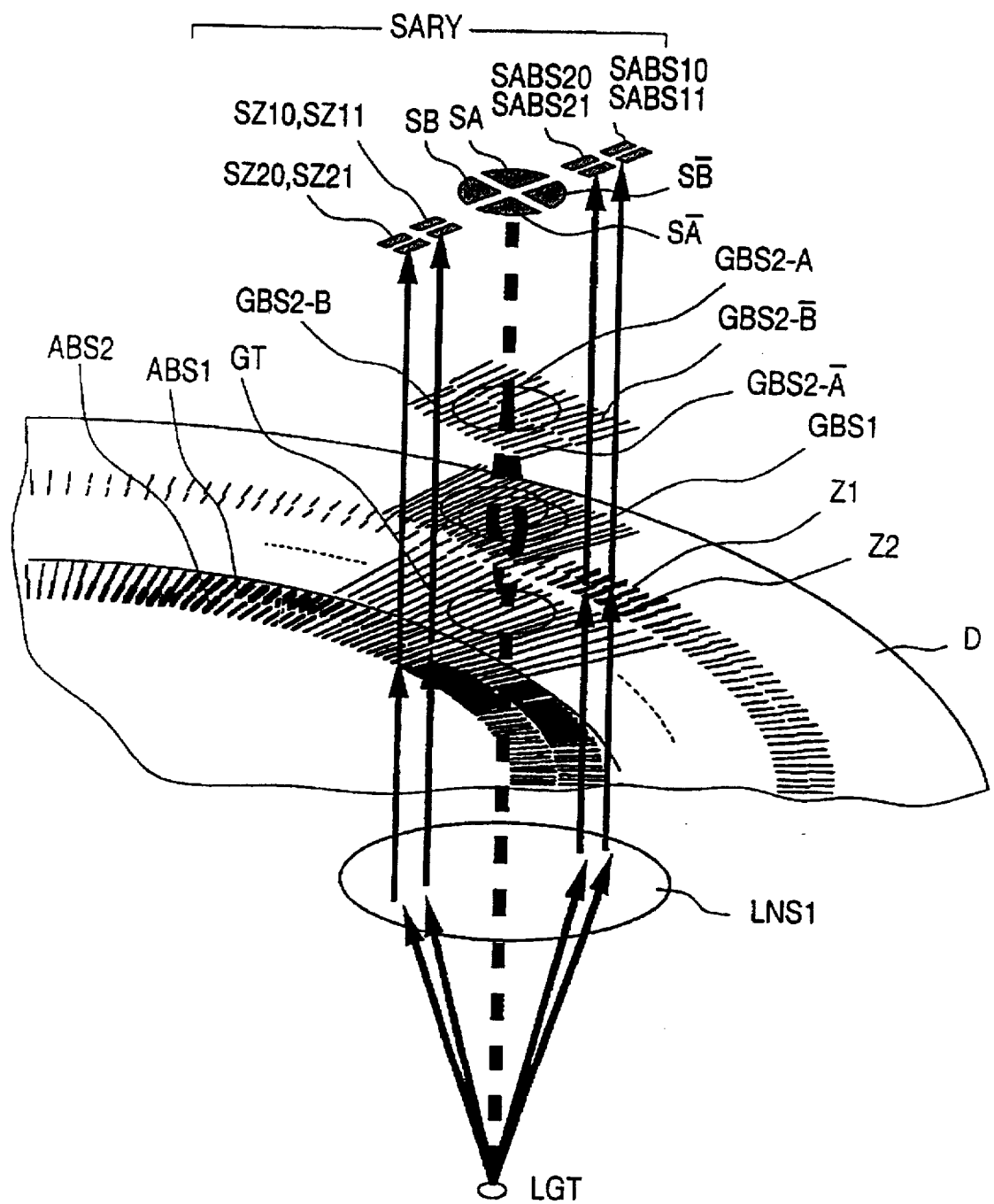
FIG. 1 is a view showing the optical layout of a rotary encoder according to the first embodiment of the present invention.
Figure 2:
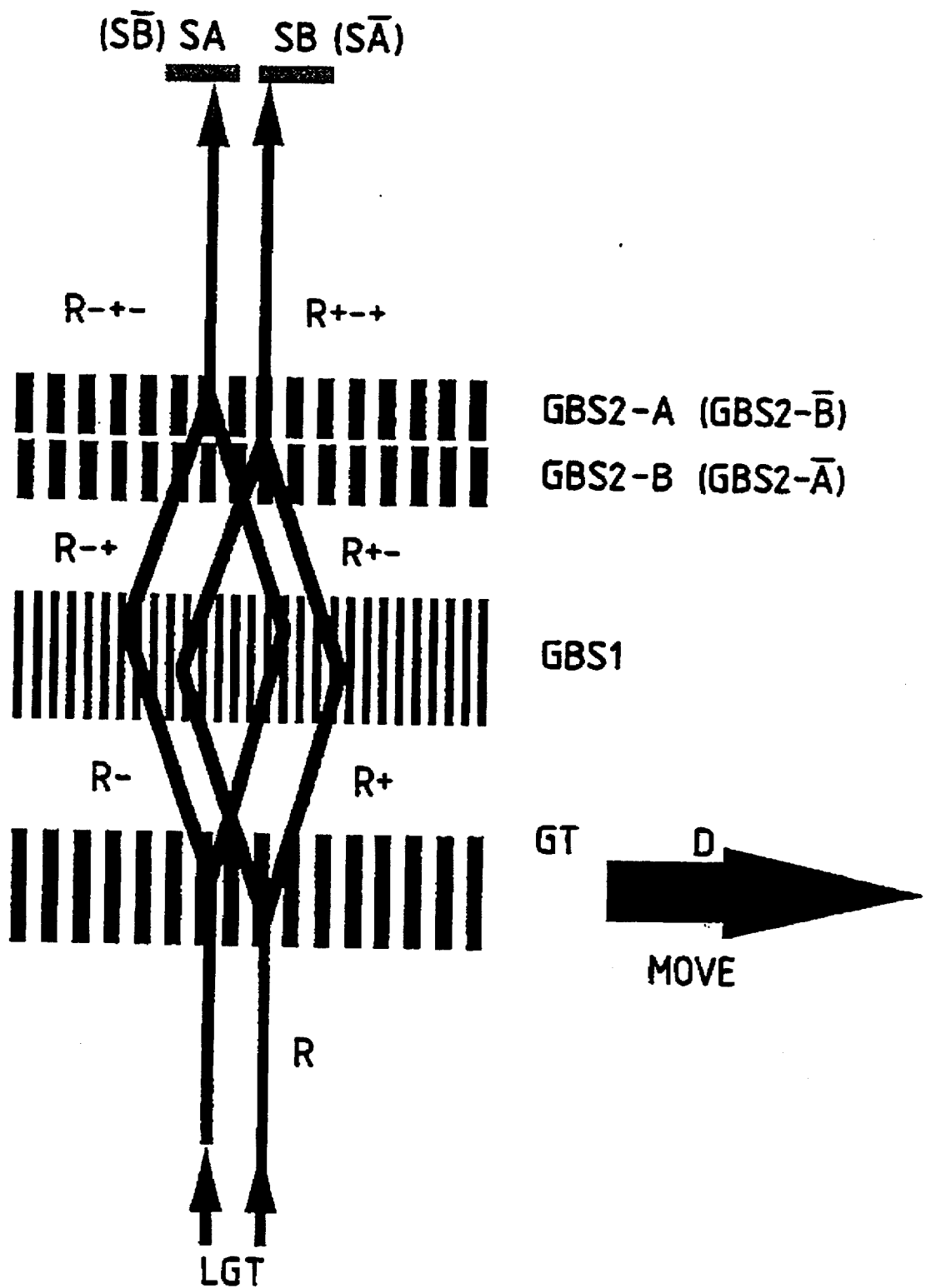
FIG. 2 is a schematic view for explaining the interference optical system optical path of the encoder.
Figure 3A:
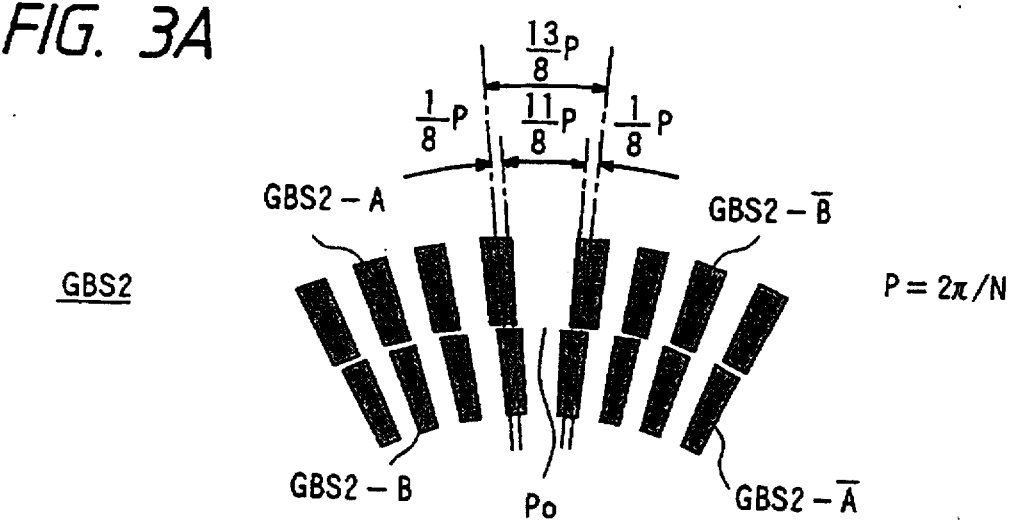
FIGS. 3A, 3B, and 3C are partial enlarged views of patterns on a disk of the encoder.
Figure 3B:
Figure 3C:
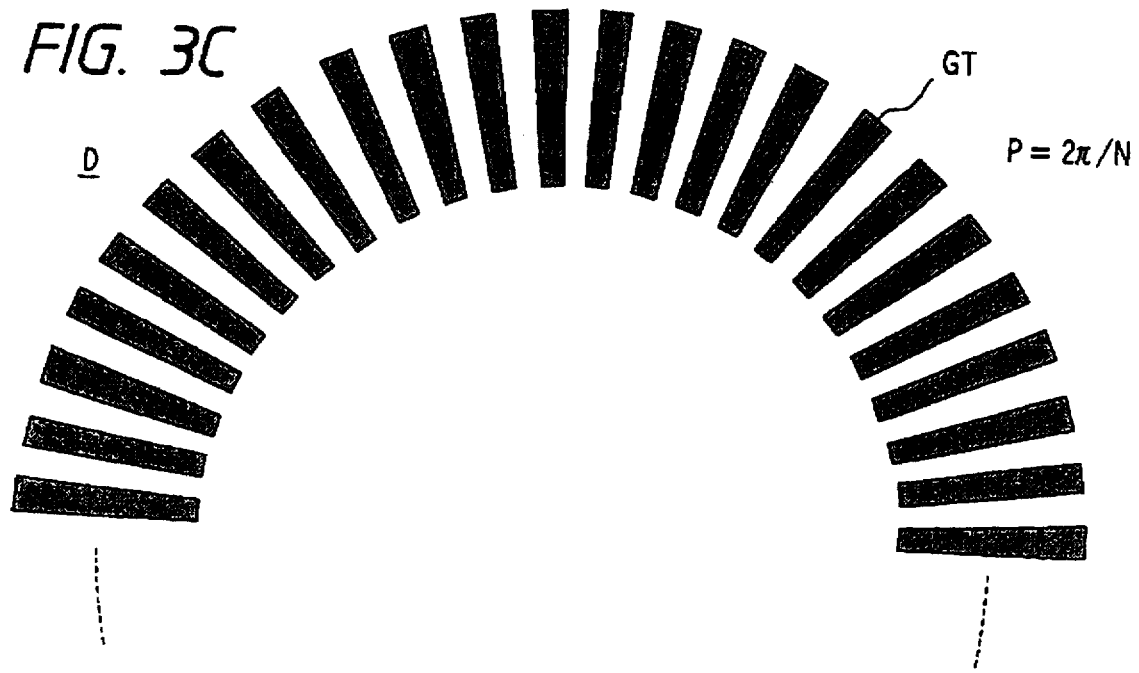
Figure 4:
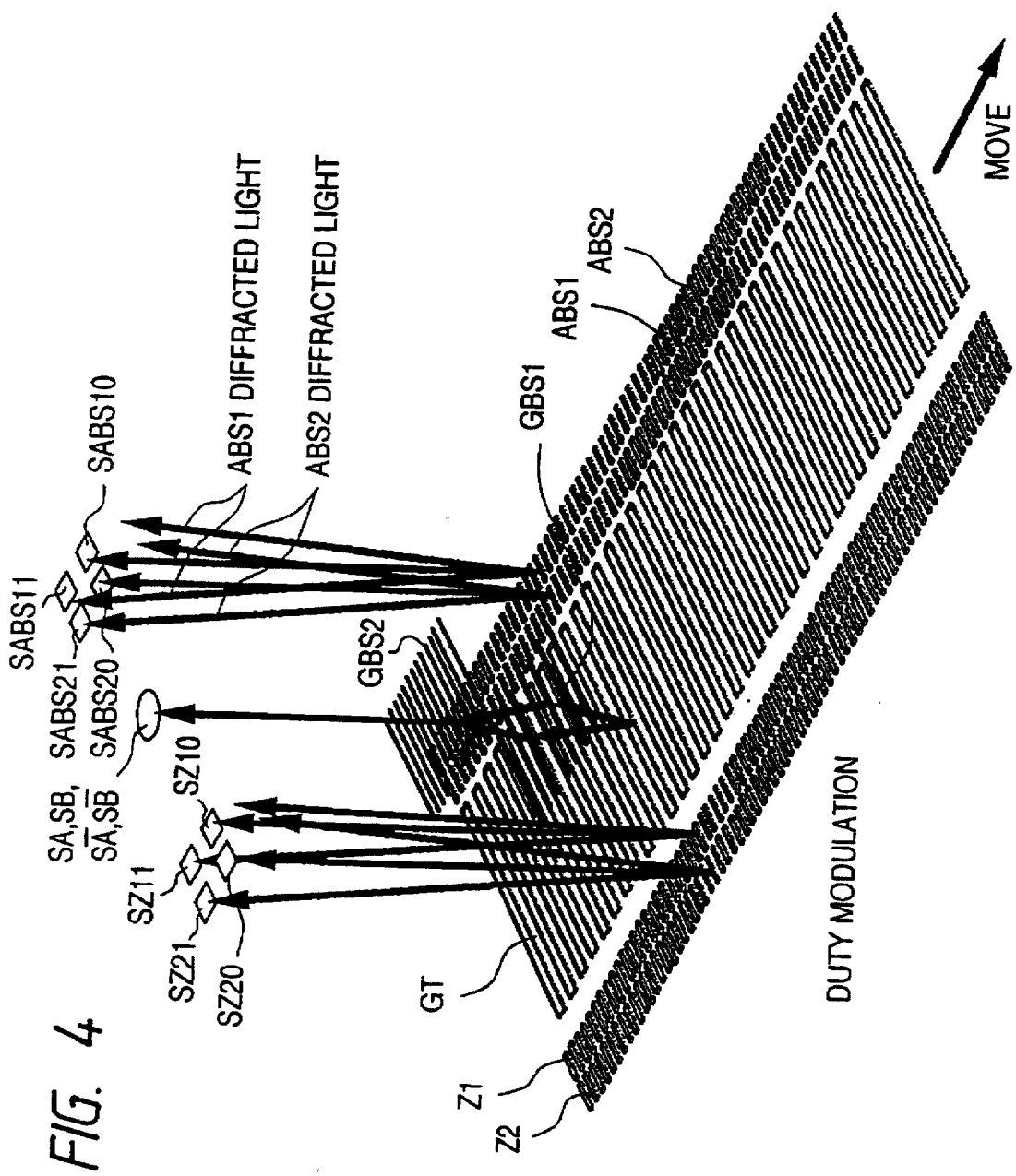
FIG. 4 is an explanatory view of the layout of the patterns of the encoder.

FIGS. 1 to 5G are explanatory views of a rotary encoder according to the first embodiment of the present invention. FIG. 1 is a view showing the optical layout of this embodiment, FIG. 2 is a schematic view for explaining the interference optical system optical path, FIGS. 3A, 3B, and 3C are partial enlarged views of patterns on a disk, FIG. 4 is an explanatory view of the layout of the patterns, and FIGS. 5A to 5G are explanatory views of the change in ratio of concave and convex portions on an origin code pattern and an absolute code pattern and the change in amount of light of directly transmitted light (0th order light) and diffraction transmitted light (1st order light). In FIG. 1, all members other than a disk D and patterns formed thereon are fixed to a stationary side apparatus main body (not shown), and the disk D is arranged on a pivot member (not shown) such as a shaft or the like. The encoder of the first embodiment will be described below with reference to the accompanying drawings.

A light beam emitted by a light source LGT such as an LED or the like is converted into a collimated light beam R by a collimator lens LNS1, and the collimated light beam is irradiated onto the relatively rotating disk D.

The disk D comprises a circular transparent substrate. On the disk D, a transmission type radial diffraction grating GT prepared by glass etching or replica formation, origin patterns Z1 and Z2 consisting of transmission type radial diffraction grating lines in which the ratio of concave and convex portions is continuously and locally changed in the circumferential direction of the disk, and absolute code patterns ABS1 and ABS2 consisting of transmission type diffraction grating lines formed by continuously and periodically changing the ratio of concave and convex portions in the circumferential direction of the disk are recorded on circumferences at different radial positions over the entire circumference of the disk (see FIG. 4).

The duties of the origin patterns Z1 and Z2 change with a phase shift between them (more specifically, a phase shift of 90°). Also, the duties of the absolute code patterns ABS1 and ABS2 change with a phase shift between them (more specifically, a phase shift of 90°).

The above-mentioned collimated light beam is irradiated onto predetermined circumferential regions of a track of the radial diffraction grating GT, tracks of the origin code patterns Z1 and Z2, and tracks of the absolute code patterns ABS1 and ABS2, as a whole. In FIG. 1, only principal light rays of a light beam portion serving as a signal light beam are indicated by arrows, and the remaining light beam portion is not shown.

If the radial diffraction grating GT has N lines per one circle of the disk, two, ±1st order diffracted light beams R+ and R− are generated by the radial diffraction grating GT (grating pitch P=2π/N rad.) irradiated with the collimated light beam. The ±1st order diffracted light beams R+ and R− are diffracted by a first diffraction grating GBS1 (grating pitch P=π/N rad.) arranged on the stationary side apparatus main body, so that their optical paths are bent, thus obtaining light beams R+− and R−+. The light beams R+ and R−+ cross at a spatial point 0 and are diffracted by a second diffraction grating GBS2 (grating pitch P=2π/N rad.) arranged there, thus obtaining light beams R+−+ and R−+−. The light beams R+−+ and R−+− are superposed on each other and interfere with each other, and emerge as interference fringes (see FIG. 2).

The first and second diffraction gratings GBS1 and GBS2, and the radial diffraction grating GT are lamellar diffraction gratings with a very fine structure that can prevent generation of 0th order diffracted light. Also, the origin patterns Z1 and Z2, and the absolute code patterns ABS1 and ABS2 (to be described in detail later) are lamellar diffraction gratings.

The diffraction grating GBS2 is divided into four regions GBS2-A, GBS2-B, GBS2-$\overline{A}$, and GBS2-$\overline{B}$ to have a point P0 as a boundary, and the grating lines are formed in these regions so that their arrangement phases are shifted by a ⅛ pitch (see FIG. 3A).

Since the collimated light beam irradiated onto the disk D is convergent, even when the light beam is diffracted by the radial diffraction grating GT and reaches the diffraction grating GBS1, the two diffracted light beams are guided to a light-receiving element via the diffraction gratings GBS1 and GBS2 while being almost entirely superposed on each other. For example, if the beam spot size of the light beam to be irradiated is 500 μm, the number N of radial grating lines is 2,500, the recording radius, r, on the disk D is 5,000 μm, and the LED wavelength, λ, is 0.86 μm, the 1st order diffraction angle is given by:

$$\theta = \arcsin\{\lambda \cdot N/(2\pi r)\} = 3.92°$$

In this case, if the gap, h, between the radial grating GT and the diffraction grating GBS1 is 500 μm, a separation amount=68.5 μm is obtained.

The diffracted light beams R+−+ and R−+− emerge from the diffraction grating GBS2 so that the optical paths of their optical axes are superposed on each other, and the optical axes extend parallel to each other. As a result, the symmetry of all the optical paths from the light beam is maintained, and the two light beams interfere with each other. In this case, the phase of the wavefront of the diffracted light R+−+ shifts by +2π when the radial diffraction grating GT moves by one pitch upon rotation of the disk, and the phase of the wavefront of the diffracted light R−+− shifts by −2π when the radial diffraction grating GT moves by one pitch upon rotation of the disk D. Thus, the interference fringes, i.e., the interference light intensity, of the interference light of the diffracted light beams R+−+ and R−+− sinusoidally changes twice when the radial diffraction grating GT moves by one pitch upon rotation of the disk.

As described above, since the diffraction grating GBS2 is divided into the four regions to have the point P0 as a boundary, and the grating lines in these regions are formed so that their arrangement phases are shifted by a ⅛ pitch, the interference phases (the phases of interference fringes) of interference light beams generated by these regions are shifted from each other by a ¼ period.

Since the interference light beams from these regions GBS2-A, GBS2-B, GBS2-$\overline{A}$, and GBS2-$\overline{B}$ are incident on light receiving elements SA, SB, S$\overline{A}$, and S$\overline{B}$ on a light-receiving element array SARY, the light-receiving elements SA, SB, S$\overline{A}$, and S$\overline{B}$ respectively generate sinusoidal analog signal currents which have 2N periods per revolution and are shifted from each other by a ¼ period. The four sinusoidal analog signals are input to a signal processing system (not shown) which performs the following signal processing. That is, the differences between corresponding inverted signals are calculated to obtain two phase-shifted sinusoidal analog signals, and using these signals, the rotation amount and direction of the disk D are calculated by a known method. Since the above-mentioned signal processing is known to those who are skilled in the art, a detailed description thereof will be omitted.

Figure 5A:
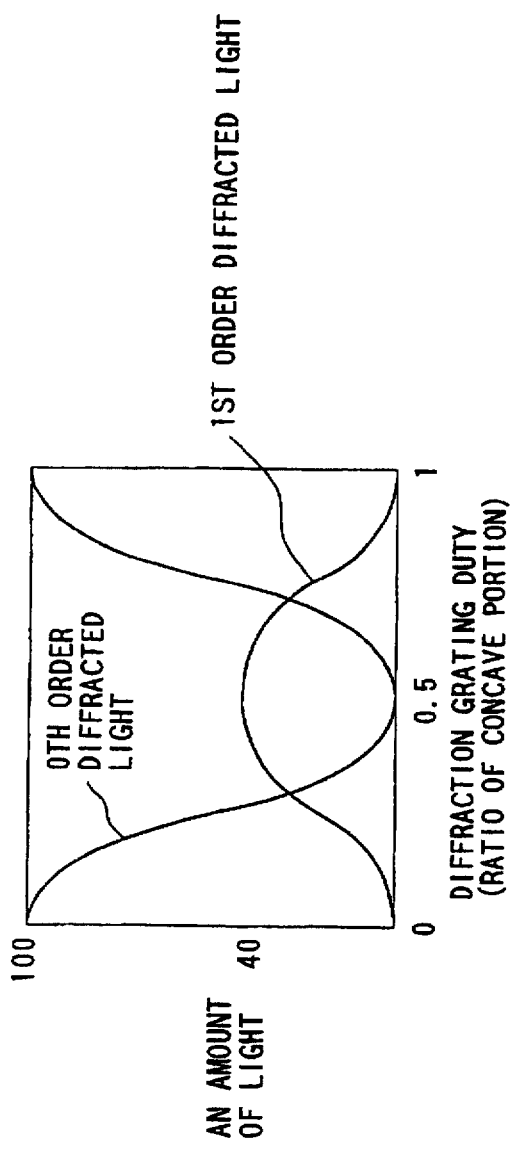
FIGS. 5A to 5G are explanatory views of the change in ratio of concave and convex portions on an origin code pattern and an absolute code pattern and the change in amount of light of directly transmitted light (0th order light) and diffraction transmitted light (1st order light)
Figures 5B, 5C, 5D, 5E, 5F, 5G:
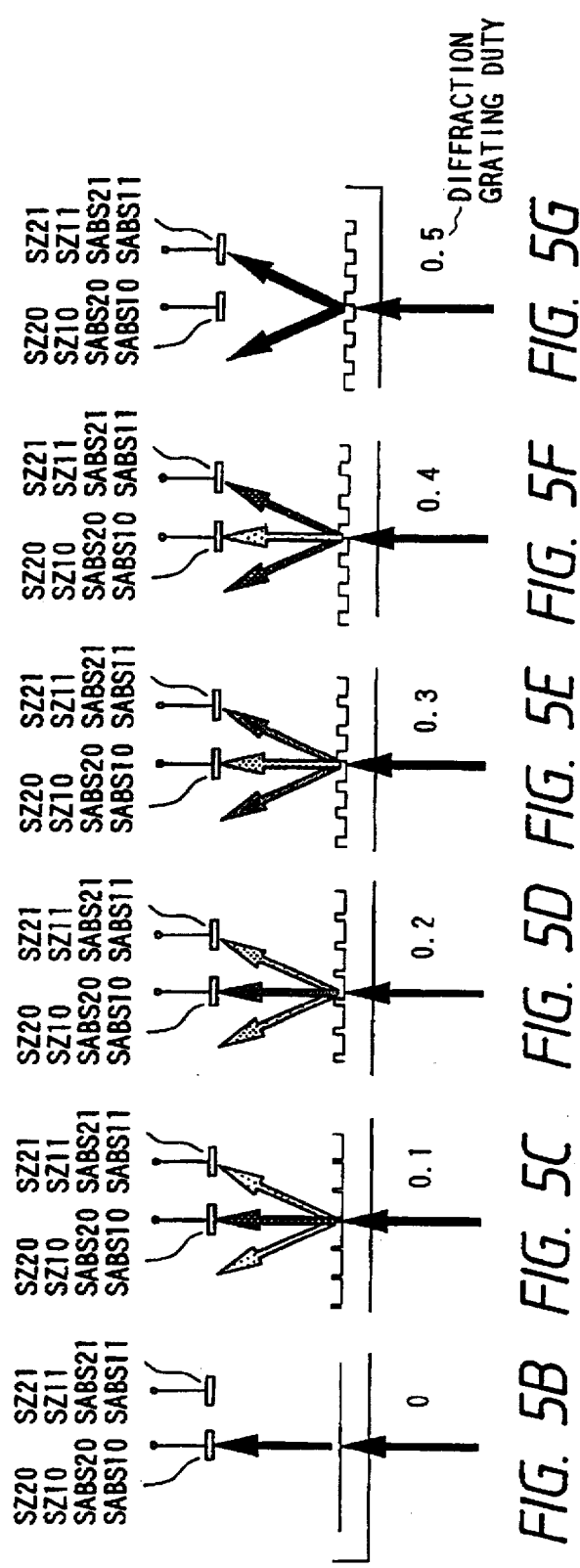

On the other hand, since the ratio of concave and convex portions on each of the origin code patterns Z1 and Z2 changes continuously, the collimated light beam irradiated onto the origin code pattern tracks Z1 and Z2 undergoes a continuous change in ratio of concave and convex portions of the origin code patterns at its irradiation position. FIGS. 5A to 5G are views for explaining changes in amount of light of directly transmitted light (0th order light) and diffraction transmitted light (1st order light) when the ratio of concave and convex portions on a region irradiated with the collimated light beam changes (FIG. 5A is a graph showing the duty and the amount of light, and FIGS. 5B to 5G are views showing the change in light-receiving state of 0th order light and 1st order light upon a change in duty; in FIGS. 5B to 5G, the amount of light becomes larger as the hatching density of an arrow becomes higher).

As shown in FIGS. 5A to 5G, the ratio of 0th order light and 1st order light changes depending on the change in ratio of concave and convex portions, and hence, the light-receiving ratios of light-receiving elements SZ10 and SZ11 which respectively receive 0th order light and 1st order light from the origin code pattern Z1, and the light-receiving ratios of light-receiving elements SZ20 and SZ21 which respectively receive 0th order light and 1st order light from the origin code pattern Z2 change. Since the ratio of concave and convex portions on the origin code pattern continuously changes, the amounts of directly transmitted light (0th order light) and diffraction transmitted light (1st order light) continuously change in correspondence with position, and these light beams are incident on the light-receiving elements SZ10, SZ11, SZ20, and SZ21 on the light-receiving element array SARY.

In this embodiment, for example, the grating layout is designed so that a portion where the duty of the diffraction grating becomes 0.5 is arranged in the vicinity of the origin position, and the diffraction grating duty continuously changes (up to, e.g., about 0.1) to have the portion as the center. When the origin code patterns Z1 and Z2 move within the irradiation region upon rotation of the disk, the amount of light which is modulated by the patterns Z1 and Z2 and is distributed to the light-receiving elements SZ10, SZ20, SZ11, and SZ21 continuously changes. In addition, since the duty change phases of the patterns Z1 and Z2 are shifted from each other by 90°, as described above, the light-receiving elements SZ10 and SZ11, and the light-receiving elements SZ20 and SZ21 have different timings of a change in amount of light. Therefore, the light-receiving elements SZ10, SZ20, SZ11, and SZ21 generate mountain-shaped waveform analog signal currents with different peak timings.

In the apparatus of this embodiment, positions having a duty of 0.5 of the diffraction grating lines of the origin code patterns Z1 and Z2 are arranged to be shifted in opposite circumferential directions through the same angle to have the origin position as the center, and the signal processing system (not shown) generates a pulse signal as an origin signal when a difference signal S(SZ10–SZ11) of the outputs from the light-receiving elements SZ10 and SZ11, and a difference signal S(SZ20–SZ21) of the outputs from the light-receiving elements SZ20 and SZ21 coincide with each other.

On the other hand, since the ratio of concave and convex portions of the absolute code patterns ABS1 and ABS2 continuously and periodically changes, the collimated light beam irradiated onto the tracks of the absolute code patterns ABS1 and ABS2 undergoes a continuous and periodic change in ratio of concave and convex portions of the absolute code patterns at the irradiation position upon rotation of the disk D. FIGS. 5A to 5G similarly show changes in amount of directly transmitted light (0th order light) and diffraction transmitted light (1st order light) when the ratio of concave and convex portions of the region irradiated with the collimated light beam changes on the absolute code patterns ABS1 and ABS2.

As shown in FIGS. 5A to 5G, the ratio of 0th order light and 1st order light changes due to the change in ratio of concave and convex portions, and as a result, the light-receiving ratio of light-receiving elements SABS10 and SABS11 for respectively receiving 0th order light and 1st order light from the absolute code pattern ABS1, and the light-receiving ratio of light-receiving elements SABS20 and SABS21 for respectively receiving 0th order light and 1st order light from the absolute code pattern ABS2, change. Since the ratio of concave and convex portions of the absolute code patterns continuously changes, the amounts of directly transmitted light (0th order light) and diffraction transmitted light (1st order light) continuously and periodically change depending on the irradiation position, and such light beams are incident on the light-receiving elements SABS10, SABS11, SABS20, and SABS21 on the light-receiving element array SARY.

The four light-receiving elements SABS10, SABS20, SABS11, and SABS21 output periodic (e.g., sinusoidal or triangular) absolute signals having phase differences. In this apparatus, an absolute position signal is output by performing numeric value coding using, e.g., a known phase discrimination circuit or the like on the basis of 90° phase difference signals, i.e., a difference signal S(SABS10–SABS11) of the outputs from the light-receiving elements SABS10 and SABS11, and a difference signal S(SABS20–SABS21) of the outputs from the light-receiving elements SABS20 and SABS21.

In this embodiment, since all the radial diffraction grating GT, the origin patterns Z1 and Z2, and the absolute code patterns ABS1 and ABS2 are formed using phase diffraction gratings, they can be easily manufactured simultaneously, and a compact layout of the grating patterns can be attained. As a result, the overall apparatus can be rendered compact. Furthermore, since the origin detection and the absolute position detection are performed by the phase diffraction gratings, these detections suffer almost no influence of pattern defects, noise due to unnecessary light, and the like, thus improving the precision of these detections.

Figure 6A:
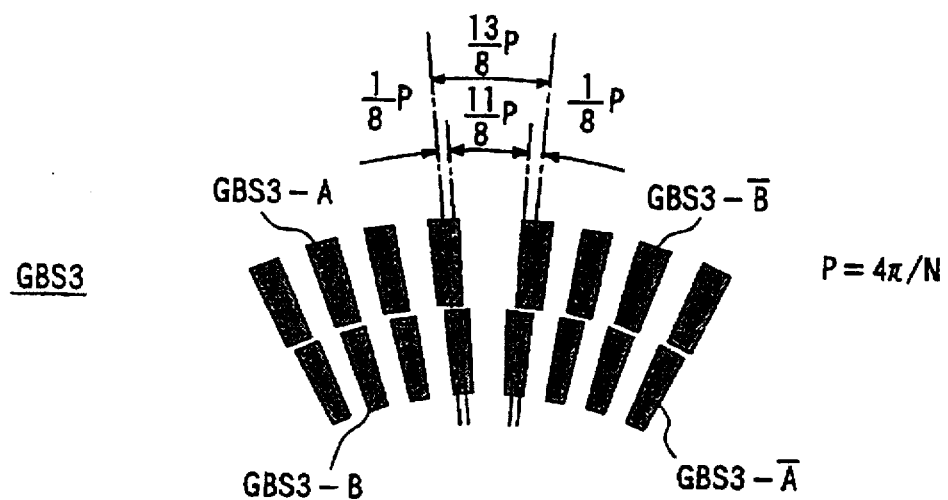
FIGS. 6A and 6B are partial enlarged views of patterns on a disk of a rotary encoder according to the second embodiment of the present invention.
Figure 6B:
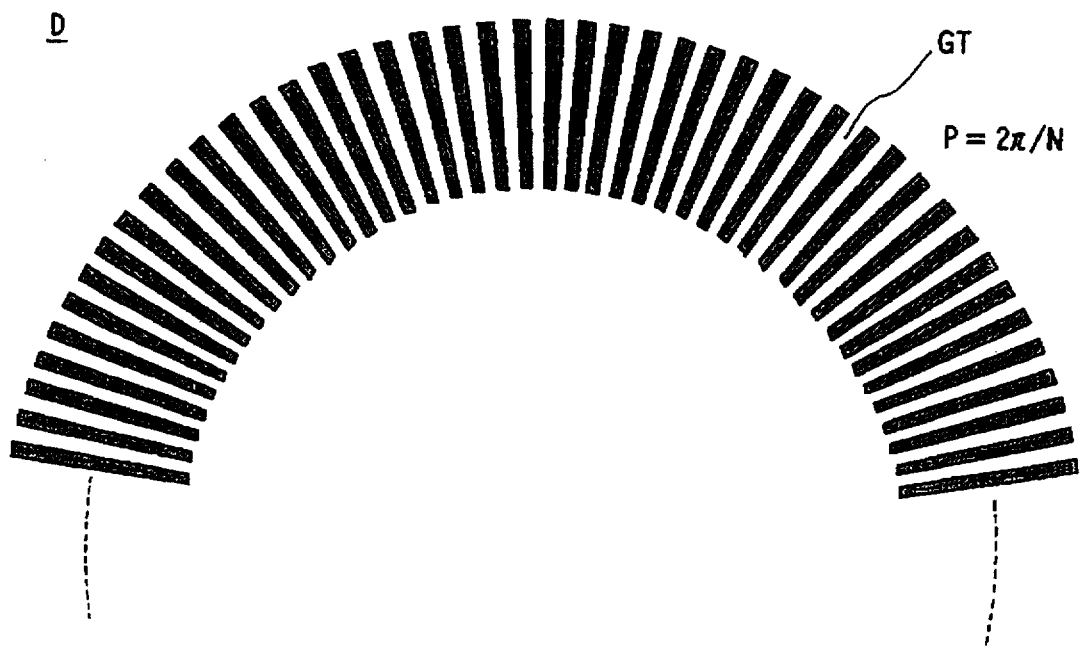
Figure 7:
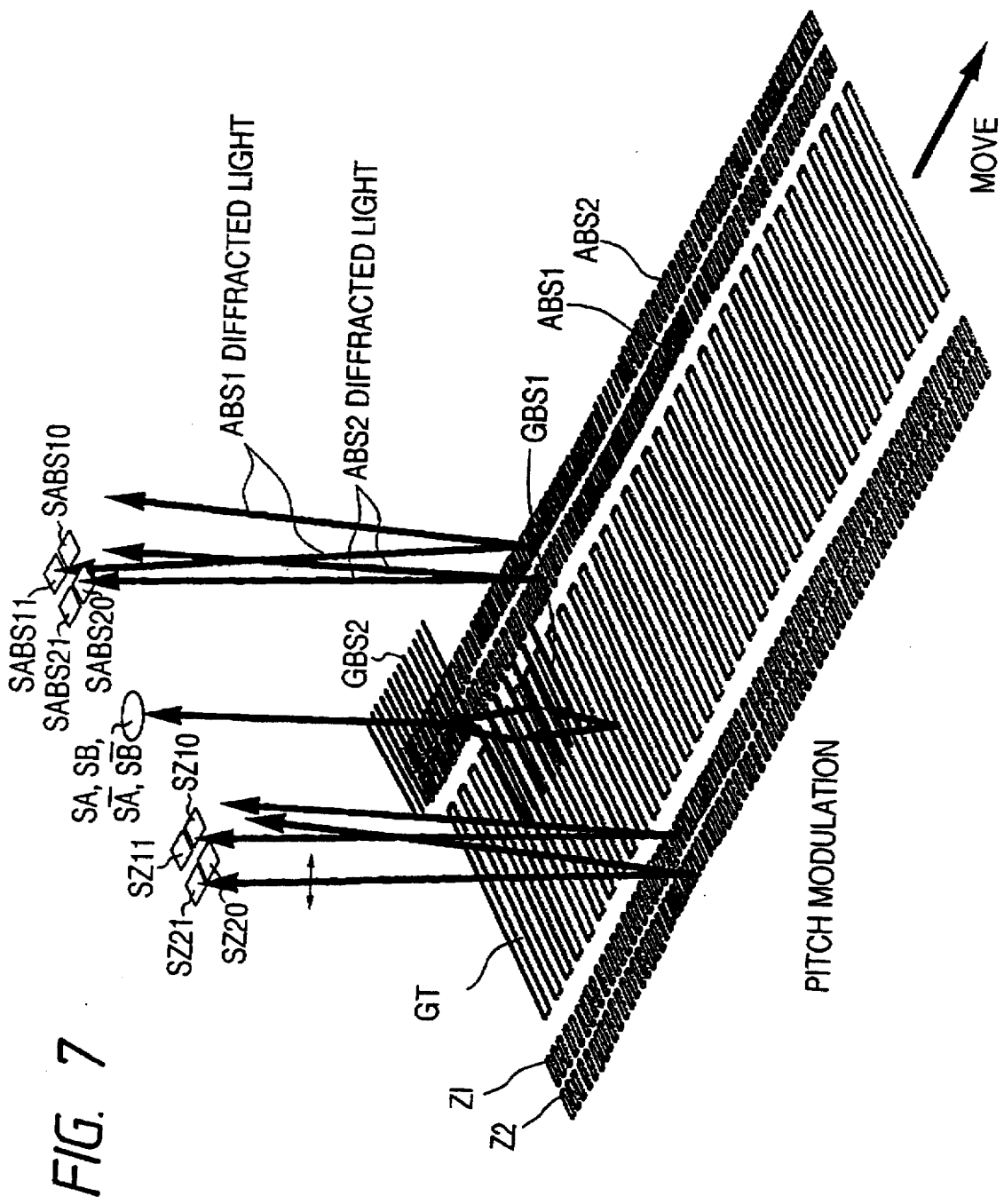
FIG. 7 is an explanatory view of the layout of the patterns of the encoder.
Figure 8:
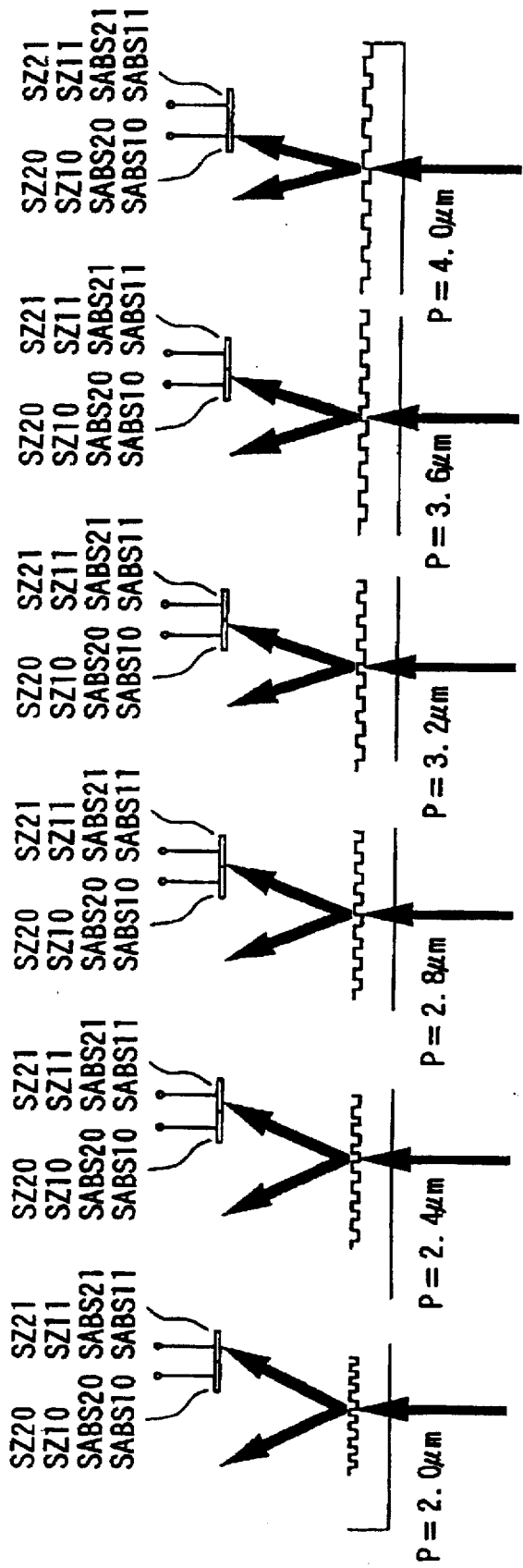
FIGS. 8A to 8F are explanatory views of the change in pitch of an origin code pattern and an absolute code pattern and the change in exit angle of diffraction transmitted light (1st order light) of the encoder.

FIGS. 6A and 6B, FIG. 7 and FIGS. 8A to 8F are explanatory views of a rotary encoder according to the second embodiment of the present invention. FIGS. 6A and 6B are partial enlarged views of patterns on a disk, FIG. 7 is an explanatory view of the layout of the patterns, and FIGS. 8A to 8F are explanatory views of changes in pitch of origin code patterns and absolute code patterns and the change in exit angle of diffraction transmitted light (1st order light). A description and illustration of the same arrangement as in the first embodiment will be omitted, and the same reference numerals denote the same parts as in the first embodiment.

In this embodiment, the detection principles of the origin and absolute signal in the first embodiment are modified. More specifically, absolute code patterns and origin code patterns are formed as phase diffraction gratings whose pitches continuously change in the circumferential direction of the disk, and the continuous change in pitch of each phase diffraction grating generates a continuous change in exit direction of 1st order diffracted light. The 1st order diffracted light is received by a plurality of light-receiving elements to detect a change in balance of the amounts of received light due to an angular change in 1st order light. The detected change is converted into numerical data using a comparator, thus obtaining a position signal (see FIG. 7).

A collimated light beam is irradiated onto tracks of origin code patterns Z1 and Z2, and when the pitch of the origin code patterns at the irradiation position continuously changes, as shown in FIGS. 8A to 8F, the exit direction of diffracted light (1st order light) continuously changes, and the light is incident on light-receiving elements SZ10, SZ20, SZ11, and SZ21 while changing its incident position in correspondence with the exit direction.

Note that the light-receiving elements (SZ10, SZ11) for receiving 1st order light from the origin code pattern track Z1 are realized by a photosensor having two adjacent split sensor portions, and the light-receiving elements (SZ20, SZ21) for receiving 1st order light from the origin code pattern track Z2 are also realized by a photosensor having two adjacent split sensor portions. The incident diffracted light moves across the boundaries of these sensor portions. In addition, assume that the irradiated light beam has a beam spot size sufficiently larger than the sensor boundary width.

The exit direction of the 1st order light from the origin code patterns continuously changes when the pitch of the grating lines changes in the irradiation region upon rotation of the disk, and the amount of incident light to be distributed to the light-receiving elements SZ10, SZ20, SZ11, and SZ21 continuously changes in correspondence with the exit direction. In addition, since the pitch change phases of the patterns Z1 and Z2 are shafted from each other by 90°, the amount of light changes at different timings on these patterns. The light-receiving elements SZ10, SZ20, SZ11, and SZ21 generate mountain-shaped analog signal currents having different peak timings. Note that the origin is determined when a difference signal S(SZ10−SZ11) of the outputs from the light-receiving elements SZ10 and SZ11, and difference signal S(SZ20−SZ21) of the outputs from the light-receiving elements SZ20 and SZ21 coincide with each other, and at this time, a pulse signal is generated as an original signal.

On the other hand, the collimated light beam is irradiated onto the tracks of absolute code patterns ABS1 and ABS2, and when the pitch of the absolute code patterns continuously changes, as shown in FIGS. 8A to 8F, the exit direction of diffracted light (let order light) continuously changes. As a result, the diffracted light is incident on light-receiving elements SABS10, SABS20, SABS11, and SABS21 while changing its incident position in correspondence with the exit direction.

Note that the light-receiving elements (SABS10, SABS11) for receiving 1st order light from the absolute code pattern ABS1 are realized by a photosensor having two adjacent split sensor portions, and the light-receiving elements (SABS20, SABS21) for receiving 1st order light from the absolute code pattern ABS2 are also realized by a photosensor having two adjacent split sensor portions. The incident diffracted light moves across the boundaries of these sensor portions.

The amount of incident light to be distributed to the light-receiving elements. SABS10, SABS20, SABS11, and SABS21 continuously changes when the pitch of the grating lines changes within the irradiation region of 1st order light from the absolute code patterns upon rotation of the disk. In addition, since the grating phases of the patterns ABS1 and ABS2 are shifted from each other by 90°, the amount of light changes at different timings on these patterns. The four light-receiving elements SABS10, SABS20, SABS11, and SABS21 output periodic (e.g., sinusoidal or pseudo-triangular) absolute signals having phase differences. Thus, for example, an absolute position signal is output by performing numeric value coding using, e.g., a known phase discrimination circuit or the like on the basis of 90° phase difference signals, i.e., a difference signal S(SABS10−SABS11) of the outputs from the light-receiving elements SABS10 and SABS11, and a difference signal S(SABS20−SABS21) of the outputs from the light-receiving elements SABS20 and SABS21.

As described above, even when the absolute code patterns and the origin code patterns comprise phase diffraction gratings whose pitches continuously change, both the effects as in the above embodiment, i.e., a size reduction and high precision, can be attained.

Figure 9:
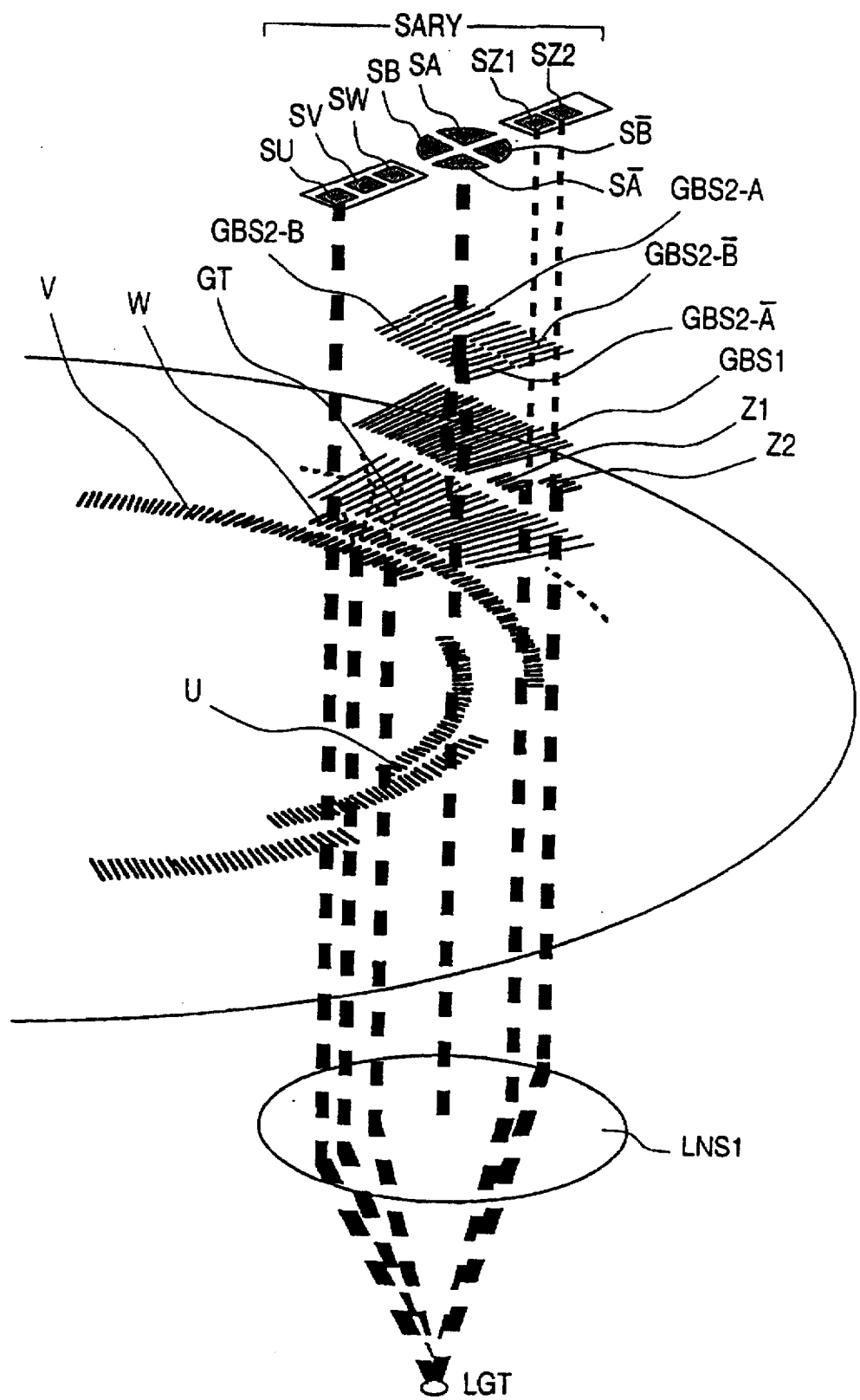
FIG. 9 is a view showing the optical layout of a rotary encoder according to the third embodiment of the present invention.
Figure 10:
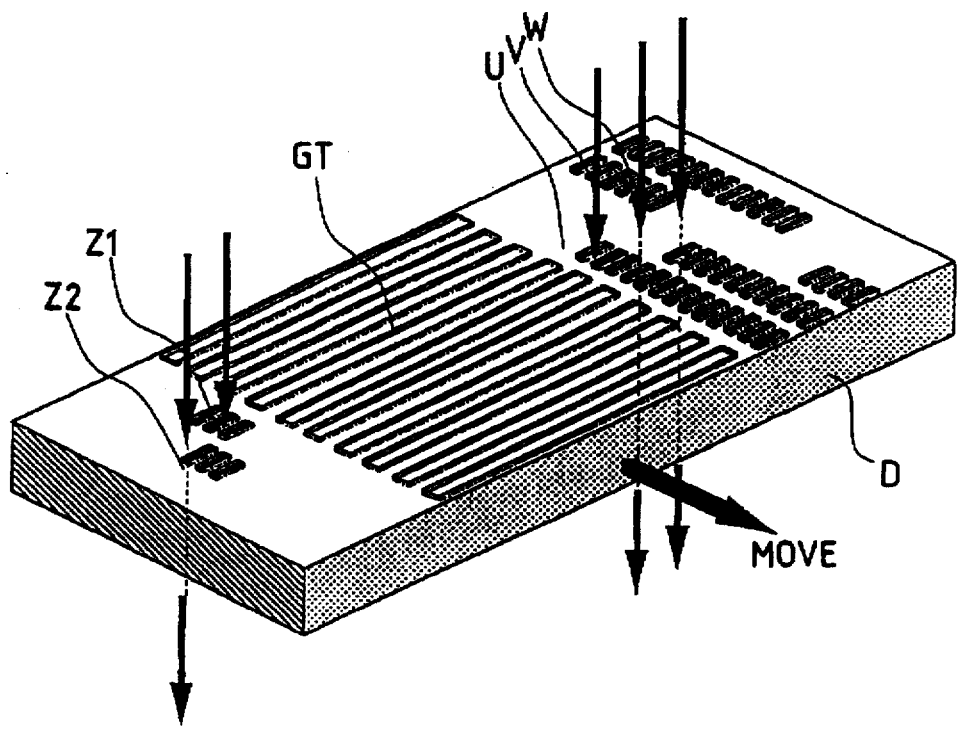
FIG. 10 is a partial enlarged view showing the disk structure in the third embodiment.
Figure 11:
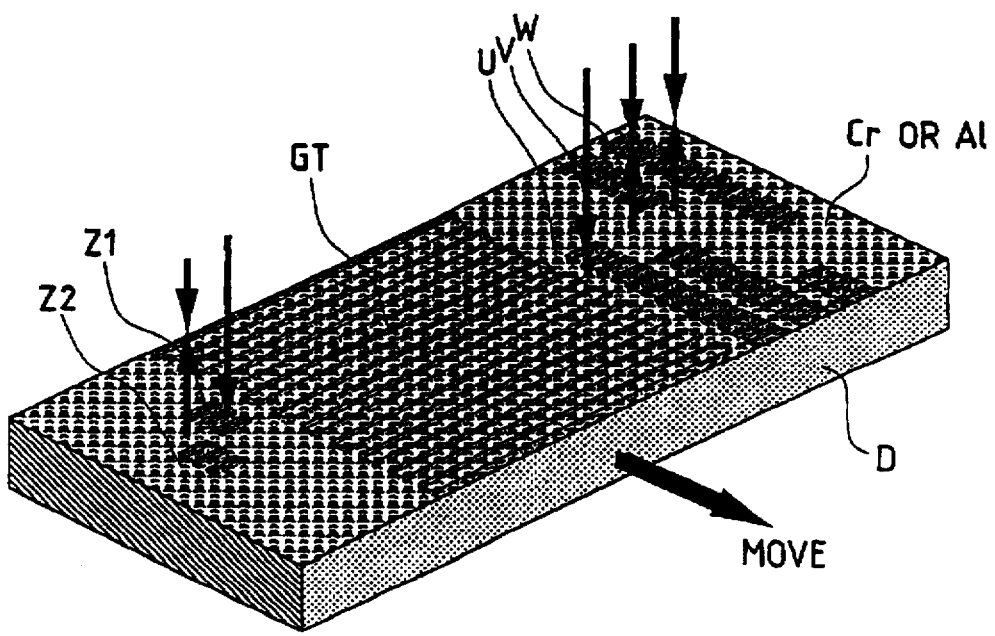
FIG. 11 is a partial enlarged view showing a modification of the disk structure in the third embodiment.

FIG. 9 is a view showing the optical layout of a rotary encoder according to the third embodiment of the present invention. FIGS. 10 and 11 are partial enlarged views of the disk structure in the third embodiment. A description and illustration of the same arrangement as in the first and second embodiments will be omitted, and the same reference numerals denote the same parts as in the first and second embodiments.

In this embodiment, absolute code patterns and origin code patterns are phase diffraction grating patterns of lamellar phase gratings arranged on only a specific portion of a disk, and the presence/absence of the phase diffraction gratings at the irradiation position of a collimated light beam is converted into the presence/absence of generation of directly transmitted light or directly reflected light, thus performing position detection. Each lamellar phase grating is designed to prevent generation of 0th order light.

In this embodiment, upon irradiation of a collimated light beam onto tracks where origin code patterns Z1 and Z2 are formed, when the irradiation region does not include any origin code patterns, the light beam is transmitted through the disk, and is incident on light-receiving elements SZ1 and SZ2. On the other hand, when the irradiation region includes origin code patterns, transmission diffracted light generated in correspondence with the irradiation position emerges from the patterns in a direction not to be incident on the light-receiving elements SZ1 and SZ2. When the origin code patterns Z1 and Z2 move within the irradiation region upon rotation of the disk, the sectional area of transmitted light to be projected onto the light-receiving elements SZ1 and SZ2 changes, and the total amount of the light beam to be irradiated onto the light-receiving elements SZ1 and SZ2 changes. Since the origin code patterns Z1 and Z2 are formed on circumferences at different radial positions on the disk, the amount of light changes at different timings on the light-receiving elements SZ1 and SZ2. More specifically, the light-receiving elements SZ1 and SZ2 generate valley-shaped analog signal currents with different bottom timings. The way of generation of an origin signal is substantially the same as in the first embodiment, except that the signal waveforms are inverted vertically, and a detailed description thereof will be omitted.

On the other hand, the collimated light beam irradiated onto tracks where absolute code patterns U, V, and W of phase diffraction gratings is transmitted through the disk in a region where no absolute code patterns are present, and reaches light-receiving elements SU, SV, and SW. On the other hand, where the patterns are present, diffracted light generated by the patterns emerges from the patterns in a direction to avoid the light-receiving elements. For this reason, transmitted light is projected onto the light-receiving elements SU, SV, and SW in correspondence with the presence/absence of the patterns on the irradiation region. The light-receiving elements SU, SV, and SW output absolute code signals, and a signal processing system (not shown) specifies an absolute position in accordance with the combination of binary data represented by the output signals. The way of specifying the absolute position is known to those who are skilled in the art, and a detailed description thereof will be omitted.

In the above-mentioned arrangement, transmission type lamellar phase gratings are formed as patterns on a transparent disk, as shown in FIG. 10. Alternatively, as shown in FIG. 11, reflection type lamellar phase gratings may be formed as patterns on a disk on the entire surface of which a chromium or aluminum reflection film is deposited.

With the above-mentioned arrangement, the incremental detection diffraction grating and the absolute code and origin position code detection patterns can have an identical microstructure, and the manufacturing process requires only glass etching or replica formation (in the case of an optical system using reflected diffracted light, the deposition process of a reflection film on the entire surface of the disk is added, as shown in FIG. 11), resulting in a simple process. When lamellar gratings are used as phase gratings, steps can be similarly formed, and a glass etching process required in this case can be performed at the same time.

Figure 12:
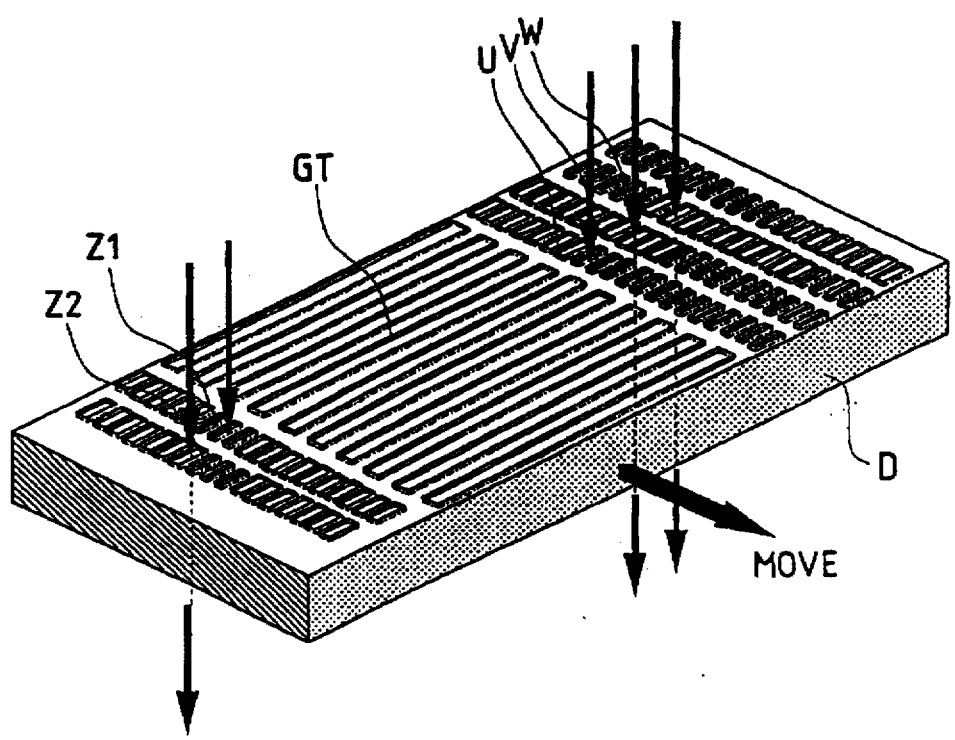
FIG. 12 is a view for explaining the arrangement according to a modification of the third embodiment.
Figure 13A:
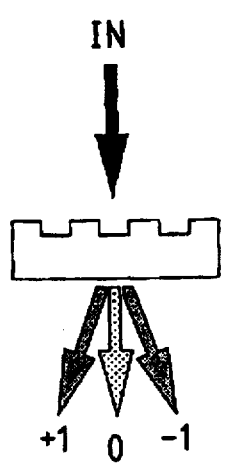
FIGS. 13A and 13B are explanatory views of the principle of the encoder.
Figure 13B:
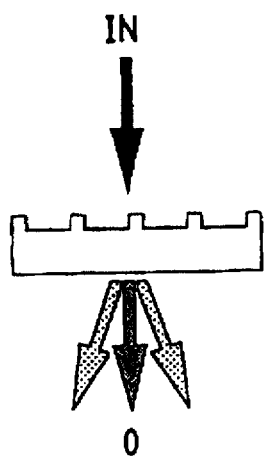

FIG. 12 is a view for explaining the arrangement of a modification of the third embodiment. In the third embodiment, the presence of the patterns directly corresponds to transmission or non-transmission of a light beam. However, in this apparatus, the relationship of transmission and non-transmission, or reflection and non-reflection of the absolute code patterns U, V, and W and the origin code patterns Z1 and Z2 is converted into a change in amount of directly transmitted or reflected light in correspondence with a change in ratio of concave and convex portions of the phase diffraction gratings, and this change is detected. FIGS. 13A and 13B are principle views of this state. FIG. 13A shows the non-transmission state, and FIG. 13B shows the transmission state. In this manner, the same effect as in the third embodiment is obtained by adopting an arrangement for determining transmission or non-transmission of a light beam in correspondence with the change in ratio of concave and convex portions of the phase grating.

With the above-mentioned arrangement, the incremental detection diffraction grating and the absolute code and origin position code detection patterns can have an identical microstructure, and the manufacturing process requires only glass etching or replica formation (the deposition process of a reflection film on the entire surface of the disk as needed), resulting in a simple process. When lamellar gratings are used as phase gratings, steps can be similarly formed, and a glass etching process required in this case can be performed at the same time.

In addition, expansions of the optical system may be expected by the following modifications.

(1) The numbers of grating lines may be changed in the separation, deflection, and synthesis optical paths of the three diffraction gratings GT, GBS1, and GBS2 within the range in which the number N1 (lines/round) of lines of the first radial diffraction grating GT, the number N2 (lines/round) of lines of the second radial diffraction grating GBS1, and the number N3 (lines/round) of lines of the second radial diffraction grating GBS2 satisfy:

$$n1 \cdot N1 + n2 \cdot N2 + n3 \cdot N3 = 0$$

where n1, n2, and n3 are the orders of diffraction by the first, second, and third diffraction gratings, and the number N of lines of the radial diffraction grating, which need not be recorded on the entire perimeter, need not always be an integer but may have a fraction. In the first embodiment n1=+1, n2=−1, n3 =+1, N1=2,500, N2=5,000, and N3=2,500.

(2) The number of divisions or the phase shift amount of an incremental phase difference signal generation diffraction grating (GBS2 in FIG. 1) may be changed (e.g., the diffraction grating may be divided into two patterns, and the phases may be shifted by 90° between the two patterns, or the grating may be divided into six patterns, and the phases may be shifted by 60° between the six patterns, and so on).

(3) The first and second embodiments may be combined, and both the duty and pitch of the patterns may be changed.

(4) The number of light-receiving elements SABS10, SABS20, SABS11, and SABS21 for absolute code pattern diffracted light may be changed (for example, two elements may be arranged).

(5) The number of light-receiving elements SZ10, SZ20, SZ11, and SZ21 for origin code pattern diffracted light may be changed (for example, two elements may be arranged).

(6) The period of changing the ratio of concave and convex portions or the pitch of the absolute code pattern may be arbitrarily set. For example, the ratio or pitch may change one period per revolution or may change, e.g., eight periods in correspondence with the number of poles of an AC motor.

(7) Incremental signal light (diffracted interference light), origin code pattern diffracted light, and absolute code pattern diffracted light may be obtained as reflected diffracted light, and the optical system and the disk structure may be modified to receive these light components.

(8) In place of dividing the origin detection pattern into two patterns Z1 and Z2 and detecting the origin position based on a difference signal of two signals, a method of detecting the peak of a correlation function by superposing two random pitch patterns may be adopted.

Figure 14:
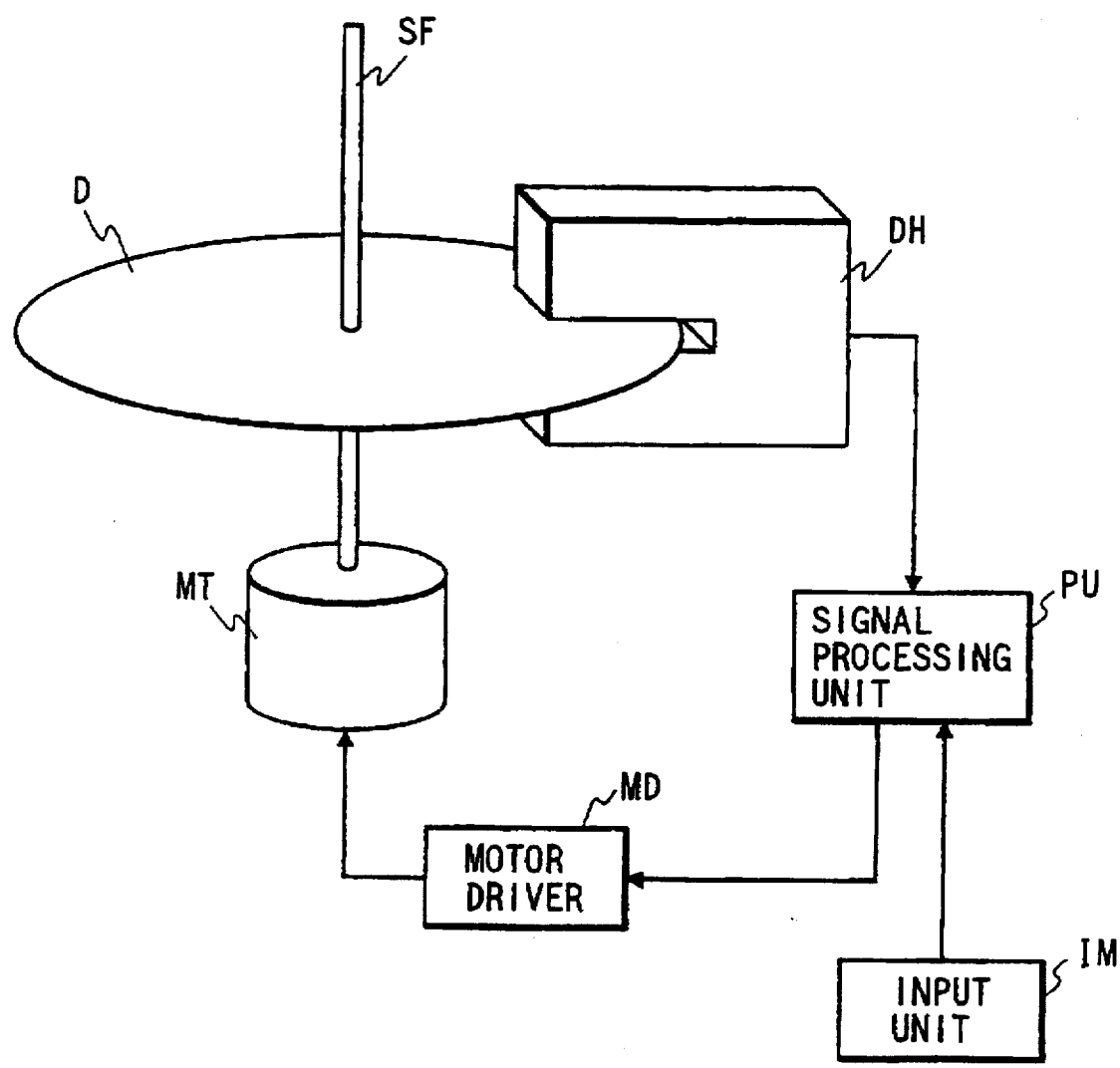
FIG. 14 is an explanatory view of a drive control apparatus according to an embodiment of the present invention.

FIG. 14 is an explanatory view of an embodiment of a system for controlling the drive operation of a motor to which the present invention is applied. Referring to FIG. 14, a detection head HD houses all the components except for the disk D in one of the above-mentioned embodiments. A signal processing unit PU performs signal processing upon reception of light-receiving signals from the light-receiving elements. An input unit IM performs an input operation such as a setting operation to the signal processing unit PU. The signal processing unit. PU is connected to a motor driver MD to which a motor MT is connected. A shaft SF to which the disk D is attached is driven by the motor MT.

Upon reception of signals output from the light-receiving elements and including rotation information of the disk D in the above-mentioned format, the signal processing unit PU performs signal processing of these signals, and calculates incremental or absolute rotation information. Then, the unit PU compares the calculated information with setting information input from the input unit IM, and outputs a command signal to the motor driver MD. Upon reception of the command signal, the motor driver MD controls the rotation of the motor MT, thus executing rotation control of the shaft.

In each of the above embodiments, the present invention is applied to rotation detection and rotation control as displacement information detection and drive control. However, the present invention can be generally applied to detection of displacement information including a straight movement, and displacement control.

What is claimed is:

1. An apparatus for detecting displacement information, comprising:

a scale to be arranged on a side of an object of which relative displacement information is to be detected, said scale including a periodic signal generation diffraction grating formed at a predetermined pitch, and a predetermined data recording portion formed independently of the periodic signal generation diffraction grating and for detecting displacement information;

a first detection system for irradiating a light beam onto the periodic signal generation diffraction grating to generate diffracted light, said first detection system forming a periodic signal corresponding to a displacement relative to said scale by detecting interference light of the diffracted light generated by the periodic signal generation diffraction grating; and a second detection system for optically detecting the predetermined data recording portion, wherein the predetermined data recording portion also has a diffraction grating.

2. An apparatus according to claim 1, wherein the periodic signal generation diffraction grating and the diffraction grating of the predetermined data recording portion are phase diffraction gratings.

3. An apparatus according to claim 1, wherein the periodic signal generation diffraction grating and the diffraction grating of the predetermined data recording portion are radial diffraction gratings.

4. An apparatus according to claim 1, wherein the predetermined data recording portion has recorded origin information of said scale with the diffraction grating.

5. An apparatus according to claim 4, wherein the predetermined data recording portion has recorded the origin information of said scale as a change in duty or pitch of the diffraction grating.

6. An apparatus according to claim 1, wherein the predetermined data recording portion has recorded absolute position information of said scale with the diffraction grating.

7. An apparatus according to claim 6, wherein the predetermined data recording portion has recorded the absolute position information of said scale as a change in duty or pitch of the diffraction grating.

8. An apparatus according to claim 1, wherein the predetermined data recording portion has recorded origin information of said scale and absolute position information of said scale with the diffraction grating.

9. A drive control apparatus comprising:

a scale arranged on a side of an object of which relative displacement information is to be detected, said scale including a periodic signal generation diffraction grating formed at a predetermined pitch, and a predetermined data recording portion formed independently of the periodic signal generation diffraction grating and for detecting displacement information;

a detection unit comprising first and second detection systems, said first detection system irradiating a light beam onto the periodic signal generation diffraction grating to generate diffracted light, said first detection system forming a periodic signal corresponding to a displacement relative to said scale by detecting interference light of the diffracted light generated by the periodic signal generation diffraction grating, and said second detection system optically detecting the predetermined data recording portion; and a control unit for controlling a displacement driving operation of the object on which said scale is arranged, on the basis of detection signals obtained by said first and second detection systems, wherein the predetermined data recording portion also has a diffraction grating.

10. An apparatus according to claim 9, wherein the periodic signal generation diffraction grating and the diffraction grating of the predetermined data recording portion are phase diffraction gratings.

11. An apparatus according to claim 9, wherein the periodic signal generation diffraction grating and the diffraction grating of the predetermined data recording portion are radial diffraction gratings.

12. An apparatus according to claim 9, wherein the predetermined data recording portion has recorded origin information of said scale with the diffraction grating.

13. An apparatus according to claim 12, wherein the predetermined data recording portion has recorded the origin information of said scale as a change in duty or pitch of the diffraction grating.

14. An apparatus according to claim 9, wherein the predetermined data recording portion has recorded absolute position information of said scale with the diffraction grating.

15. An apparatus according to claim 14, wherein the predetermined data recording portion has recorded the absolute position information of said scale as a change in duty or pitch of the diffraction grating.

16. An apparatus according to claim 9, wherein the predetermined data recording portion has recorded origin information of said scale and absolute position information of said scale with the diffraction grating.

17. A displacement information detection scale to be arranged on a side of an object of which relative displacement information is to be detected, comprising:

a periodic signal generation diffraction grating formed at a predetermined pitch to generate diffracted light which is to be detected in an interference state upon irradiation of a light beam from an external portion, a periodic signal corresponding to a displacement of said scale relative to the external portion being obtained by detecting the diffracted light in the interference state; and a predetermined data recording portion which is formed independently of said periodic signal generation diffraction grating so as to be optically detected by the external portion for the purpose of relative displacement information detection of said scale, said predetermined data recording portion also having a diffraction grating.

18. A scale according to claim 17, wherein said periodic signal generation diffraction grating and the diffraction grating of said predetermined data recording portion are phase diffraction gratings.

19. A scale according to claim 17, wherein said periodic signal generation diffraction grating and the diffraction grating of said predetermined data recording portion are radial diffraction gratings.

20. A scale according to claim 17, wherein said predetermined data recording portion has recorded origin information of said scale with the diffraction grating.

21. A scale according to claim 20, wherein said predetermined data recording portion has recorded the origin information of said scale as a change in duty or pitch of the diffraction grating.

22. A scale according to claim 17, wherein said predetermined data recording portion has recorded absolute position information of said scale with the diffraction grating.

23. A scale according to claim 22, wherein said predetermined data recording portion has recorded the absolute position information of said scale as a change in duty or pitch of the diffraction grating.

24. A scale according to claim 17, wherein the predetermined data recording portion has recorded origin information of said scale and absolute position information of said scale with the diffraction grating.

* * * * *

UNITED STATES PATENT AND TRADEMARK OFFICE
CERTIFICATE OF CORRECTION

PATENT NO. : 5,663,794
DATED : September 2, 1997
INVENTOR(S) : Ishizuka

It is certified that error appears in the above-identified patent and that said Letters Patent is hereby corrected as shown below:

On title page
[56] References Cited:

FOREIGN PATENT DOCUMENTS

Line 1, "8210824 8/1996 Japan" should read --8-210824 8/1996 Japan--.

COLUMN 1:

Line 11, "suitabe" should read --suitable--.

COLUMN 3:

Line 45, "(grating pitch P=2π/N red.)" should read --(grating pitch P=2π/N rad.)--; and Line 50, "R+" should read --R+- --.

COLUMN 7:

Line 18, "shafted" should read --shifted--.

Signed and Sealed this

Fifth Day of May, 1998

Attest:

BRUCE LEHMAN

*Attesting Officer*   *Commissioner of Patents and Trademarks*